United States Patent [19]
Everett

[11] 3,740,121
[45] June 19, 1973

[54] VISUAL SCANNER
[75] Inventor: George Everett, Burlington, Conn.
[73] Assignee: Gros-Ite Industries, Inc., Farmington, Conn.
[22] Filed: Nov. 3, 1971
[21] Appl. No.: 195,349

[52] U.S. Cl. .............. 350/247, 350/254, 350/257, 350/26
[51] Int. Cl. ............................................. G02b 7/02
[58] Field of Search .................. 350/245–257, 115, 350/37–39, 75, 26; 95/15; 285/178, 224, 412

[56] References Cited
UNITED STATES PATENTS

| | | | |
|---|---|---|---|
| 2,410,722 | 11/1946 | Eckert | 350/255 |
| 3,244,424 | 4/1966 | Cope | 285/178 |
| 2,953,970 | 9/1960 | Maynard | 350/257 |
| 947,971 | 2/1910 | Konig | 350/247 |
| 3,388,650 | 6/1968 | Westphalen | 350/247 |
| 3,560,080 | 2/1971 | Wilezynski | 350/252 |
| 2,861,484 | 11/1958 | Rance | 350/247 |
| 1,615,216 | 1/1927 | Cruger | 350/115 |

Primary Examiner—David Schonberg
Assistant Examiner—Michael J. Tokar
Attorney—Harry G. Shapiro

[57] ABSTRACT

A device is provided for scanning the field of view of an optical instrument. The device includes a housing for connection to the optical instrument and a scanning means which has freedom to move in any direction to cover the area of an aperture in the housing which communicates with the optical instrument. Holding means releasably fix the position of the scanning means with relation to any given portion of the aperture and, therefore, the field of view. Interchangeable optical means may be mounted on the scanning means to increase the magnification of the area viewed.

14 Claims, 17 Drawing Figures

INVENTOR.
GEORGE EVERETT

INVENTOR
GEORGE EVERETT
BY
Harry S. Shapiro
ATTORNEY

INVENTOR.
GEORGE EVERETT
BY
Harry G. Shapiro
ATTORNEY

VISUAL SCANNER

This invention relates to optical instruments and, more particularly, to a device for scanning the field of view of an optical instrument to isolate a portion thereof for closer observation.

BACKGROUND OF THE INVENTION

When using optical instruments, such as microscopes, telescopes, slide projectors, overhead viewers, etc., it is highly desirable to be able to scan the field of view of these instruments, and to thus more closely examine a selected portion or portions of the field.

Devices have been developed to magnify a portion of the field of view of an optical instrument, but these prior art devices have been less than successful for several reasons. Many of these devices do not allow complete freedom of movement of the scanning instrument over the entire field of view, so that the scanning operation is difficult, time-consuming, and often less than complete. Also, many of the prior art devices are so cumbersome that their use may cause undesirable movement of the primary optical instrument. Further, many of the prior art devices do not have means to fix the position of the scanning apparatus, and those devices which have such means often restrict the scanning ability of the device or produce changes in the portion of the field of view being observed.

SUMMARY OF THE INVENTION

To overcome the limitations of the prior art devices, the device of the invention comprises a housing for connection to an optical instrument, and a scanning means adjustably related to the housing. The scanning means has freedom to move in any direction to cover the area of an aperture in the housing which communicates with the optical instrument. Holding means releasably fix the position of the scanning means with relation to any given portion of the aperture and, therefore, the field of view. Interchangeable optical means, such as lenses, may be mounted on the scanning means to increase the magnification of the area viewed by the apparatus.

An object of the invention is to provide apparatus for scanning a field of view to enable selection of any portion of the field of view for special attention.

Another object of the invention is to provide apparatus for scanning a field of view of an optical instrument which allows the user to magnify any portion of the field of view.

It is yet another object of the invention to provide an apparatus for scanning the field of view of an optical instrument which includes means to centralize the scanning means.

Still another object of the invention is to provide apparatus for scanning a field of view of an optical instrument which affords complete freedom of movement in both rotation and translation to enable selection of any section of the field of view for examination.

A further object of the invention is to provide apparatus for scanning the field of view of an optical instrument which does not alter the setting of the optical instrument to which it is attached.

It is another object of the invention to provide apparatus for scanning a field of view of an optical instrument which can be releasably held in any given position with relation to the field of view.

Yet another object of the invention is to provide apparatus for scanning a field of view of an optical instrument which is adaptable for use with a variety of optical instruments, such as microscopes, telescopes, slide projectors, overhead viewers, etc.

It is still another object of the present invention to provide an apparatus for scanning a field of view which has a rugged, simplified construction, is relatively inexpensive to fabricate, and reliable in operation.

These, and other advantages and improved results of the invention, will be apparent from the following detailed description, taken in conjunction with the drawings illustrating preferred embodiments of the invention.

DESCRIPTION OF THE PREFERRED EMBODIMENT

Figure 1:
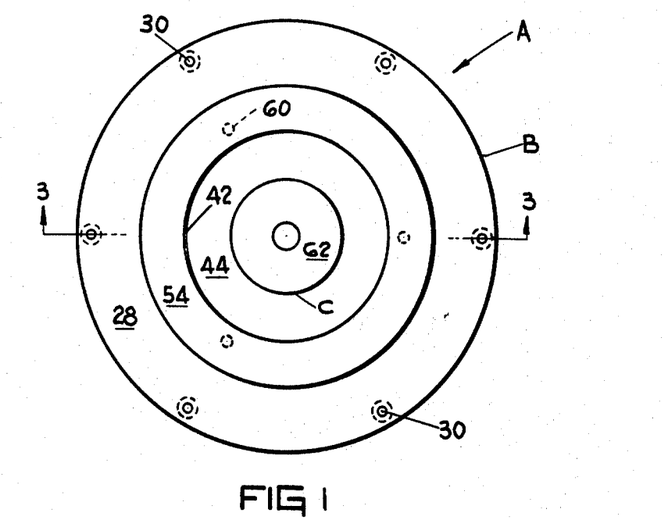
FIG. 1 is a plan view of apparatus for scanning a field of view, made in accordance with the invention.
Figure 2:
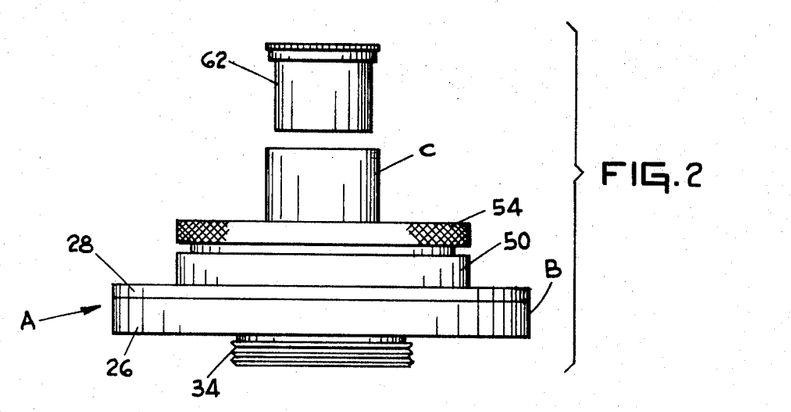
FIG. 2 is a front view of the apparatus.
Figure 3:
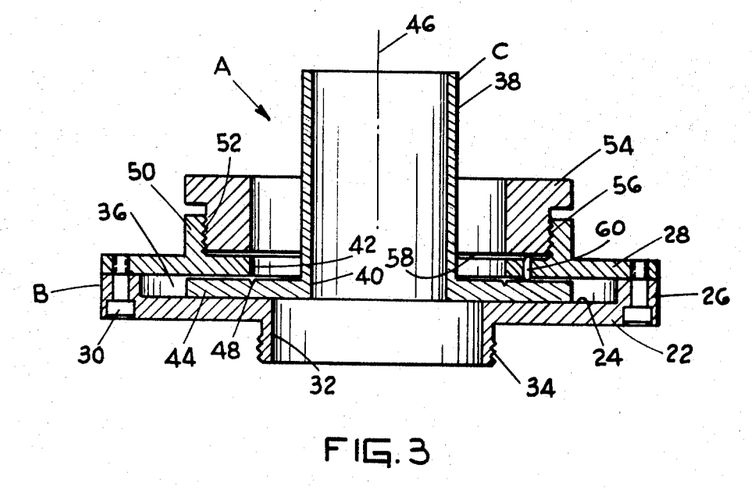
FIG. 3 is a vertical cross sectional view taken approximately in the plane of lines 3—3 of FIG. 1.

FIGS. 1 through 4 show an apparatus for scanning a field of view generally indicated as A. As best shown in FIG. 3, the apparatus includes a housing B formed from an annular base member 22 having a flat surface or wall 24 and an annular spacing shoulder 26 extended upwardly therefrom. An annular cover member 28 is fastened to the shoulder 26 by screws 30 or any other convenient fastening means. The cover member 28 acts as a confining means in coaction with the flat surface 24 to define a plane of movement in the form of an annular slot 36 in the housing. The base member 22 has a first aperture 32 formed therein which extends upward into the housing, and which is surrounded by connecting means 34 extending downwardly from the base member.

As also shown in FIG. 3, a scanning means C is formed of tubular construction and has a wall 38 to provide an inner hollow section and to furnish a second aperture 40. A third aperture 42 extends through the cover member 28 of the housing B. Positioning means in the form of an annular flange 44 extends from the bottom of the scanning means C and is disposed within the slot 36 so that the axis 46 of the scanning means is constrained to be substantially perpendicular to the plane of the base member 22 of housing B, which is also the plane of movement. Therefore, the plane of the second aperture 40 is substantially parallel to the plane of the first aperture 32.

The lateral dimension or diameter of the slot 36 is much greater than the lateral dimension or diameter of the flange 44 constituting the positioning means for the scanning means C. The diameter of the third aperture 42 is substantially greater than the diameter of the tubular wall 38, and is greater than the diameter of the first aperture 32. Also, the diameter of the first aperture 32 at its intersection with the plane of movement, is greater than the diameter of the tubular wall 38. As a result, the scanning means C may cover every portion of the area of the first aperture 32, due to the described arrangement of the flange 44 within the slot 36. The scanning means C may be rotated or translated in any direction while being constrained for movement in the plane of movement. The scanning means C is conveniently moved over the area of the first aperture by grasping the tubular wall 38 and moving it. A centering groove 48 in the upper surface of the positioning means coacts with the edge of the third aperture 42 in cover 28 to indicate when the scanning means is centered with relation to the first aperture.

Holding means is provided for releasably holding the scanning means in any position with relation to the first aperture. As shown in FIG. 3, the holding means includes an annular shoulder 50 having an internal threaded section 52 extending upwardly from the cover member 28 which engages with a locking ring 54 having an externally threaded section 56. The bottom surface 58 of locking ring 54 engages spaced locking pins 60 mounted in passages which extend through the cover 28. The opposite ends of the locking pins engage the annular flange 44 to force it against the base member 22 in order to fix the position of scanning means C and, therefore, the position of the second aperture 40 with relation to the first aperture 32.

Figure 4:
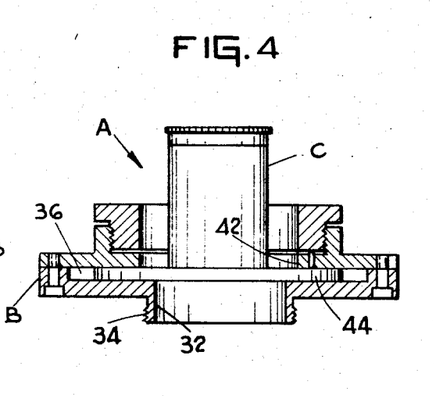
FIG. 4, 4A, and 4B are views similar to FIG. 3 showing the apparatus with the scanning means in different positions.
Figure 4A:
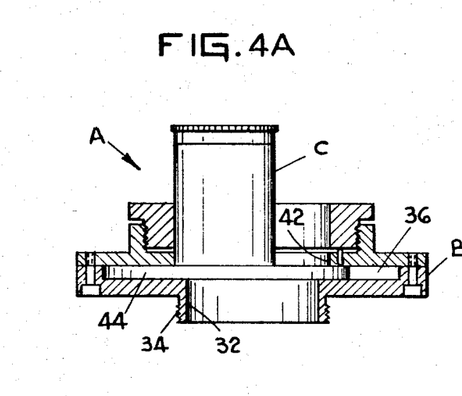
Figure 4B:
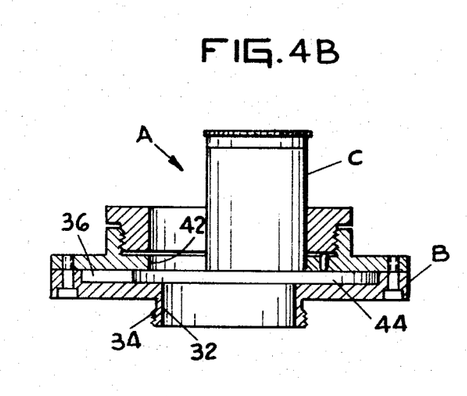
Figure 5:
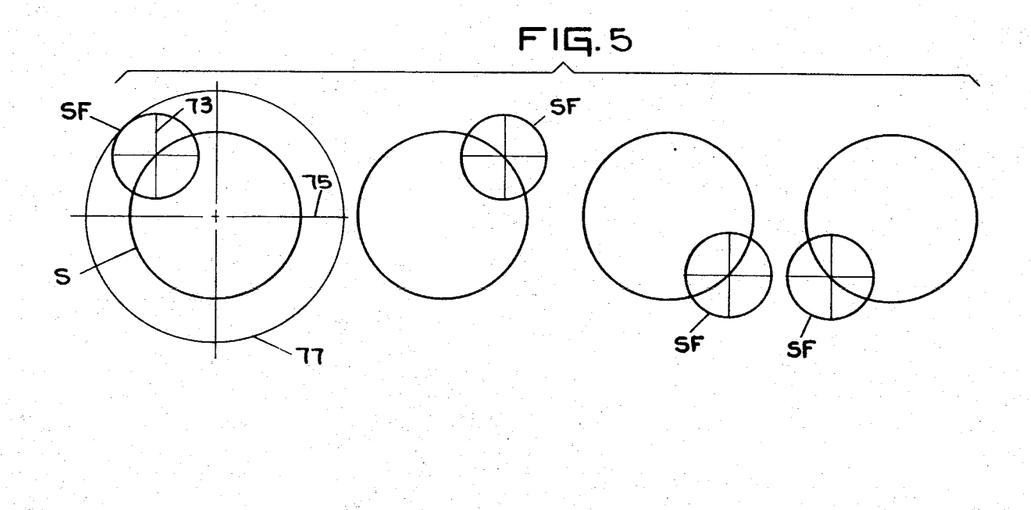
FIG. 5 schematically illustrates the manner in which the apparatus is used to examine solar prominences.

As shown in FIGS. 4 and 5, the scanning means C may be moved to cover the entire area of the first aperture 32 through which the field of view is communicated from the optical instrument connected to the scanning apparatus.

FIG. 5 schematically represents the relationship between the first aperture and the scanning means C. In the lefthand-most quarter of FIG. 5, the entire field of view defined by the first aperture 32 is shown by circle 77. The optical axis of the optical instrument to which the scanning device is connected is shown by center lines 75. The object to be scanned is shown by the circle S centered in the field of view 77. The scanning field of view is defined by aperture 40 of the scanning means C and is shown by the circle SF. In FIG. 5, it can be seen that the scanning field can be moved in any manner and direction within the field of view 77 to completely cover the object S to be scanned. Though the cross hairs 73, which represent the optical axis of the scanning means C, are shown in the same relative attitude as the scanning member is moved over the object scanned, the optical axis of the scanning means can be rotated or translated in any manner within the limits of travel imposed on scanning means C by the housing B.

As shown in FIG. 2, a wide variety of optical members 62 can be interchangeably used with this device. For example, eyepieces of different magnification can easily be mounted in the scanning means, which can be adapted for either slide fit engagement or threadable engagement with the various optical members. As shown in FIG. 5, the optical members mounted in the scanning means can include secondary optical aids such as cross hairs, or filtering devices (not shown), The freedom of movement of the scanning means C is especially useful when interchangeable optical members 62 are used to vary the magnification power of the scanning field or study field SF. Ordinarily, it is often necessary to realign an optical instrument, for example, a telescope, with each substantial change in magnification that is desired, since the area within the field of view decreases with increased magnification power. Therefore, unless the area to be magnified is directly centered in the field of view of the optical instrument, that area may be excluded as the field of view is narrowed when the magnification is increased. In contrast, when using the scanning apparatus and changing the optical member 62 to provide the desired magnification, the precise area of the scanned object S which is sought to be observed in the magnified study field can easily be located by merely moving the scanning means C to cover that portion of the object S which is of interest, rather than by having to realign the entire optical instrument.

Connecting means 34 extending from the housing's base member 22 enables the scanning apparatus A to be used in a wide variety of applications.

For purposes of brevity, the same items appearing in more than one figure will be given the same referenced numerical designation.

Figure 6:
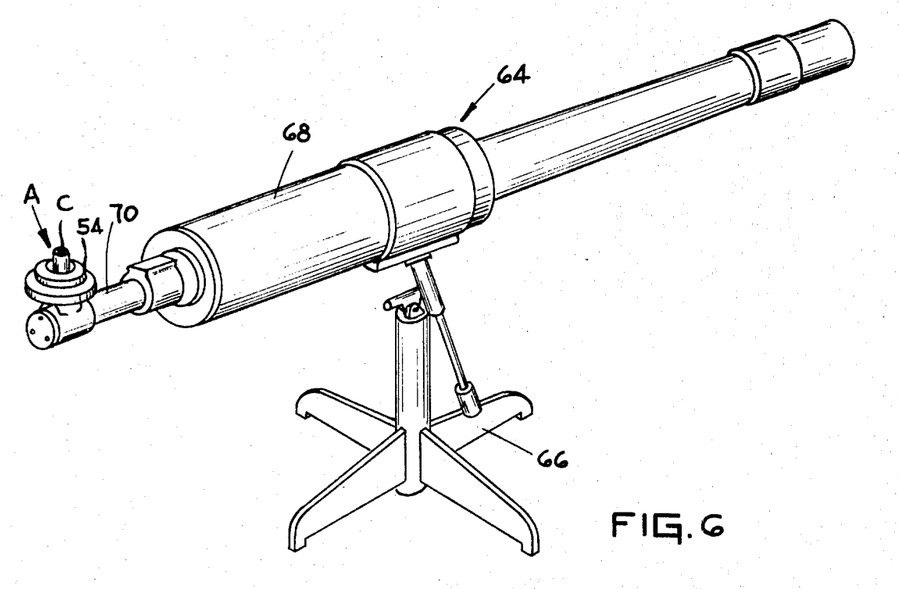
FIG. 6 shows the apparatus installed on a telescope.

FIG. 6 shows a telescope generally indicated at 64 having a base 66, optical barrel 68 and an eyepiece section 70 to which the visual scanning apparatus A is connected. This type of telescope is a solar prominence type telescope. In this application, the visual scanning device is especially useful for closely examining the solar prominences extending from the surface of the sun. As schematically represented in FIG. 5, the edge of the object to be scanned S, in this case the sun, can be completely examined by moving the study field SF around the entire circumference of the sun. It is possible to closely examine certain areas of the field of view of the telescope without having to adjust the setting of the telescope or change the position of the telescope, both of which would be necessary without the use of the scanning device of the invention. An increase in magnification of the localized area for study may be easily obtained by merely substituting a higher magnification optical member 62 within scanning means C. (FIG. 2).

Figure 7:
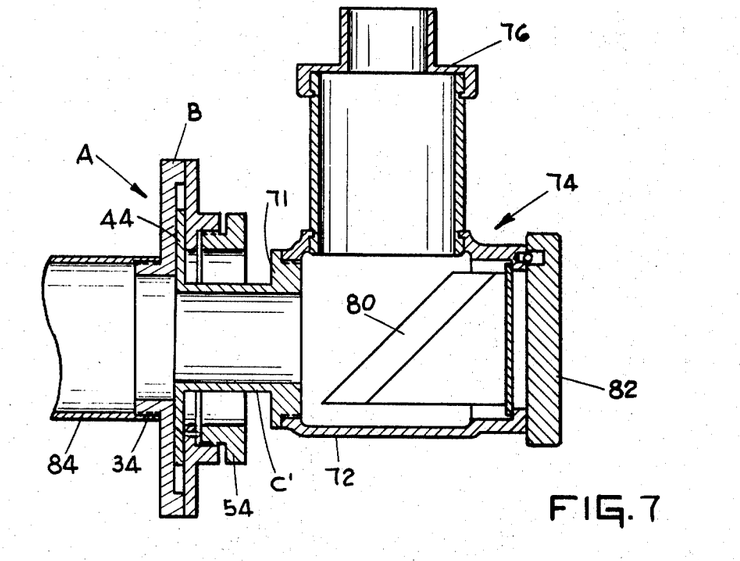
FIG. 7 shows the apparatus installed on an optical device in conjunction with a camera.
Figure 8:
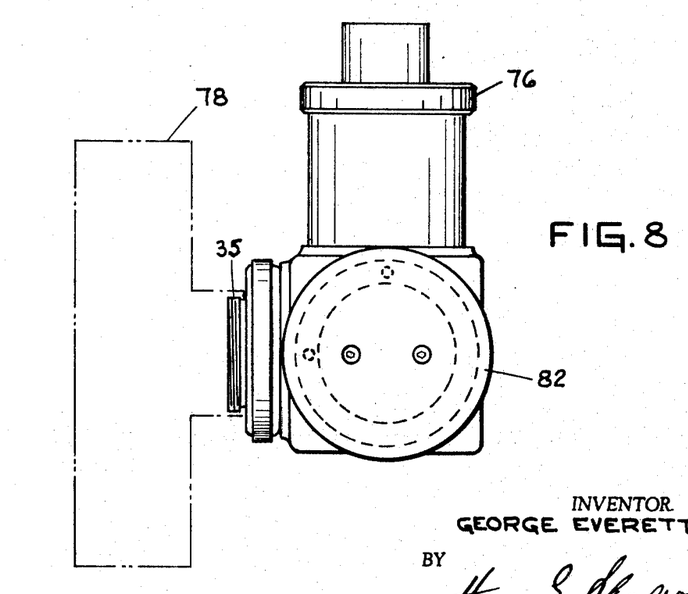
FIG. 8 is a side view of FIG. 7.

FIGS. 7 and 8 show the scanning apparatus adapted for use with a reflex camera system. The scanning means, designated C', in this embodiment includes a mounting flange 71 which fits into the objective lens mounting section of the body 72 of a reflex camera 74. The camera has an eyepiece section 76 disposed at a right angle to a camera mechanism schematically represented as 78. A mirror 80 is rotatably mounted within the camera body 72 and is rotated by a control knob 82 to direct the image to the eyepiece 76 or to the opening 35 and on to the film of the camera. As shown in FIG. 7, connecting means 34 of the scanning apparatus A is connected to a tube or portion 84 of an optical instrument, such as a microscope, telescope, etc.

Figure 9:
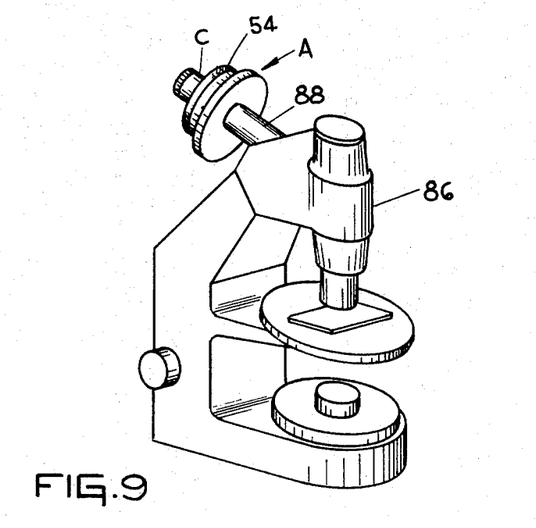
FIG. 9 shows the apparatus installed on a microscope.

FIG. 9 shows the scanning apparatus of the invention as used for scanning the field of view of a microscope. A microscope generally indicated at 86 has a draw tube 88 to which the scanning device A is connected. The field of view of the microscope is scanned in the same manner previously described, namely, by manually moving the scanning means C over the entire surface of the first aperture in the housing of the device. The application of the scanning device to a microscope provides several distinct advantages. It is not necessary to move the slide of the microscope in order to select the area which is desired for closer inspection, nor is it necessary to readjust the setting of the microscope.

Figure 10:
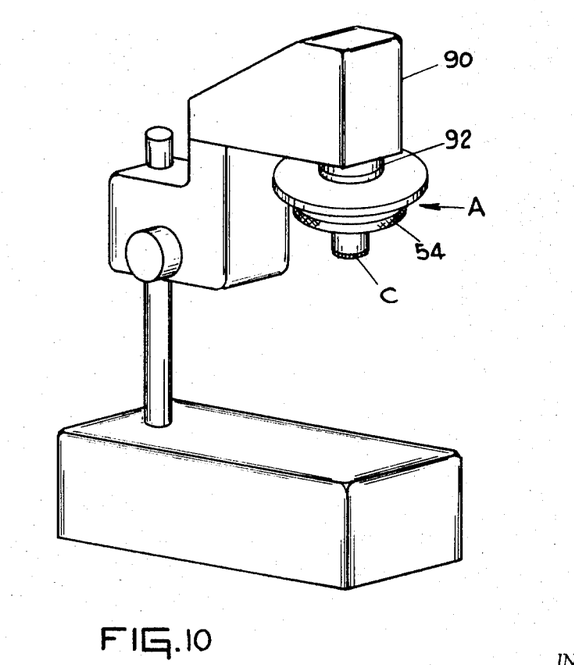
FIG. 10 shows the apparatus installed on an overhead projector.
Figure 11:
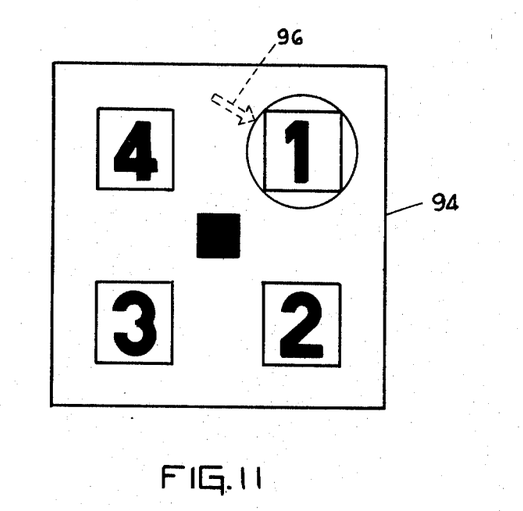
FIG. 11 shows the effect produced by the projector of FIG. 10 having the scanning apparatus connected thereto.

The scanning device can also be used to great advantage with overhead projectors or slide projectors. FIG. 10 shows an overhead projector generally indicated at 90 having a mount for the objective lens of the projector 92 connected to connecting means 34 of the scanning device. As shown in FIG. 11, the normal field of view of the overhead projector, which may consist of a chart 94, could then be scanned by the scanning device so as to select area 1 of the chart only. In such an application, a pointing device could also be included in the optical member mounted in the scanning means of the device to produce the arrow image 96 shown pointing to the area to be examined.

Figure 12:
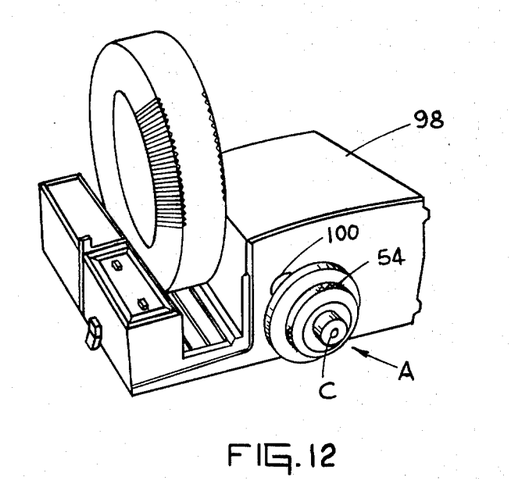
FIG. 12 shows the apparatus installed on a slide projector.

The scanning device may also be used in combination with a standard slide projector. As shown in FIG. 12, a slide projector generally indicated at 98 has a mount for a projecting lens 100. The scanning device A may be connected to mount 100 by the means as previously described. The scanning device can scan an entire slide in order to concentrate on particular segments of the slide for which more detailed viewing is desired, in the same manner as shown in FIG. 11.

Figure 13:
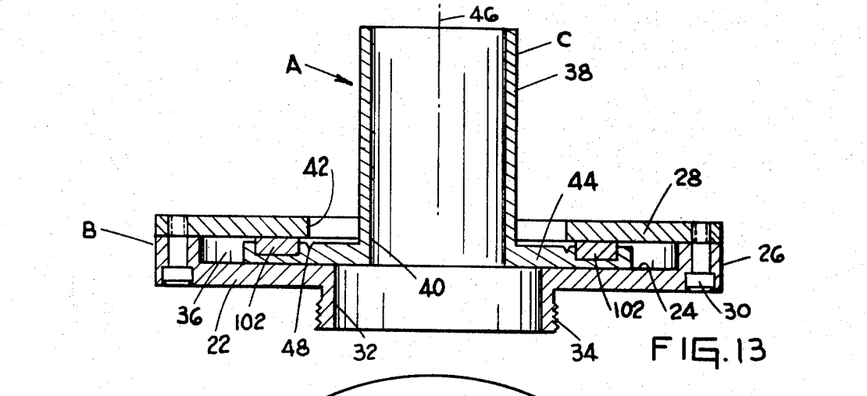
FIG. 13 is a vertical cross-sectional view of another embodiment of apparatus for scanning a field of view, this embodiment employing magnetic means for holding the position of the scanning means.
Figure 14:
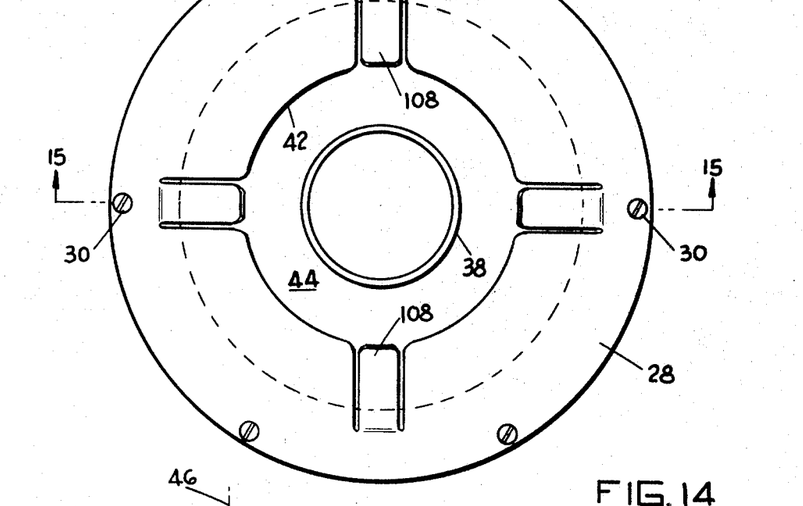
FIG. 14 is a top view of still another embodiment of the invention.
Figure 15:
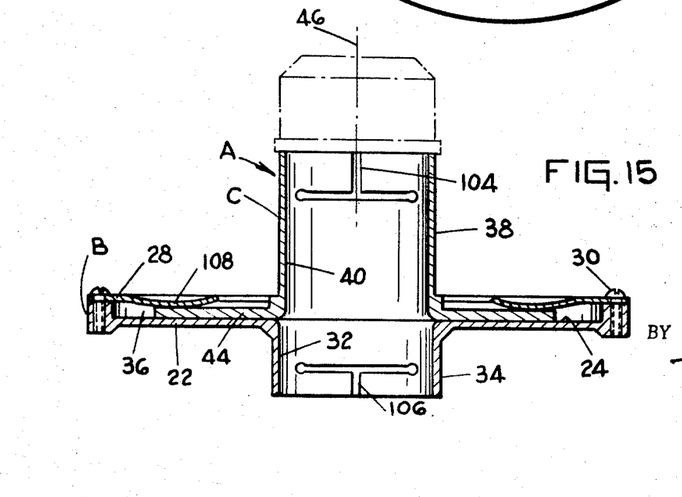
FIG. 15 is a vertical cross-sectional view taken approximately in the plane of line 15—15 of FIG. 14.

FIGS. 13, 14 and 15 show two additional embodiments of the scanning apparatus. FIG. 13 shows a scanning apparatus having a modified holding means which consists of magnetic means 102 mounted in the upper surface of the positioning means 44. The magnets 102 coact with the underside of the cover 28 of housing B to hold the positioning means and, therefore, the scanning means C in fixed position with relation to the housing B. Movement of the scanning means C within housing B is accomplished by exerting enough force on the scanning means to overcome the attractive force of the magnets 102 to slide the positioning means 44 within the slot 36 to the desired location.

Alternatively, a suitable number of spaced magnetic segments may be secured to the cover member 28 or base member 22 instead of to the positioning means or flange 44 as illustrated. It will be understood that the element, coacting with the magnetic segments, whether the cover 28, the base 22 or projecting means 44, is formed from a material that is attracted to a magnet.

FIGS. 14 and 15 show a modified lightweight construction of the scanning apparatus having a scanning means C with slot means 104 for receiving and mounting the optical member in the scanning means and slot means 106 for mounting connecting means 34 of base B within the primary optical instrument. The holding means for fixing the position of the scanning member C with relation to the housing B consists of a plurality of resilient fingers 108 formed from the top cover 28 of the housing B to press against the top of positioning means 44 to urge the positioning means 44 against surface 24 of the base member 22. The frictional engagement between positioning means 44 and surface 24 of base member 22 and the frictional resistance between fingers 108 and the top surface of positioning means 44 is sufficient to hold the scanning means C in a given location within the housing. The scanning means can be moved to any location within the housing by merely exerting enough force to overcome the frictional force restraining the movement of the scanning means.

The described scanning apparatus adds flexibility to any optical instrument, such as a camera, microscope, telescope, slide projector, overhead projector, etc. The device may be employed to change the resolution of the optical instrument without having to refocus the apparatus or to readjust the position of the instrument, which are often cumbersome and undesirable operations. Additionally, the holding means construction allows the scanning means to be conveniently held in one particular area of the field of view being scanned without disturbing the setting of the optical apparatus.

The construction of the scanning device allows the positioning means and thus the scanning means to figuratively float within the housing of the device over the entire field of view to be scanned, as defined by the first aperture in the base of the housing. It should also be pointed out that the scanning means can be rotated as well as translated so that certain accessory equipment, as for example, polarized filters, marking arrows, cross hairs, etc., can be placed in the scanning means and effectively utilized.

It is believed that the advantages and improved results of the invention will be apparent from the foregoing description of a preferred embodiment of the invention. It will be apparent that various changes and modifications may be made without departing from the spirit and scope of the invention as sought to be defined in the following claims.

I claim:

1. Apparatus for scanning a field of view comprising a housing having a wall with a first aperture, a cover member spaced from the wall to provide an annular slot, a tubular member adapted to mount optical means thereon, the tubular member providing a second aperture smaller than the first aperture, a projection extending laterally from the tubular member positioned in the slot, the diameter of the slot being substantially greater than the lateral dimension of the projection to permit the tubular member to be both slideable and rotatable to adjust the position of the second aperture with respect to the first aperture, and holding means associated with the projection to releasably fix the position of the tubular member and thereby the second aperture with respect to the first aperture.

2. Apparatus for scanning a field of view according to claim 1 wherein the projection extending laterally from the tubular member is an annular flange.

3. Apparatus for scanning a field of view according to claim 2 wherein the cover member has an opening providing a third aperture substantially larger in diameter than the diameter of the tubular member, the diameter of the third aperture being greater than the diameter of said first aperture.

4. Apparatus for scanning a field of view according to claim 3 further comprising means surrounding the first aperture for connecting the housing to optical apparatus.

5. Apparatus for scanning a field of view according to claim 4 further comprising means for centering the tubular member with respect to the first aperture.

6. Apparatus for scanning a field of view according to claim 2 wherein the holding means comprises spaced locking pins extending through the cover member having their ends in engagement with the annular flange, and a locking ring in threaded engagement with means provided by the cover member engageable with the opposite ends of the locking pins.

7. Apparatus for scanning a field of view according to claim 4 wherein the holding means comprises spaced locking pins extending through the cover member having their ends in engagement with the annular flange, and a locking ring in threaded engagement with means provided by the cover member engageable with the opposite ends of the locking pins.

8. Apparatus for scanning a field of view according to claim 4 wherein the holding means comprises magnetic means.

9. Apparatus for scanning a field of view according to claim 4 wherein the holding means comprises resilient fingers extending from the cover member in engagement with the annular flange.

10. Apparatus for scanning a field of view according to claim 1 further comprising a microscope having a draw tube; and connecting means extending from the housing about the first aperture and connected to the draw tube of the microscope.

11. Apparatus for scanning a field of view according to claim 1 further comprising a slide projector having a mount for a projecting lens; and connecting means extending from the housing about the first aperture and connected to the mount.

12. Apparatus for scanning a field of view according to claim 1 further comprising a telescope having an eyepiece section; and connecting means extending from the housing about the first aperture and connected to the eyepiece section.

13. Apparatus for scanning a field of view according to claim 1 further comprising an overhead projector having a mount for an objective lens; and connecting means extending from the housing about the first aperture and connected to the mount.

14. Apparatus for scanning a field of view according to claim 1 further comprising a camera having an objective mounting means; and means connecting the scanning means of the scanning device to the objective mounting means of the camera.

* * * * *